March 23, 1965 R. SHOTTENFELD ET AL 3,175,041

FM STEREO DEMODULATOR USING TIME DIVISION SWITCHING

Filed June 11, 1962 3 Sheets-Sheet 1

INVENTORS
Richard Shottenfeld
Solomon Abilock
BY Blum, Moscovitz, Friedman & Blum
ATTORNEYS March 23, 1965 R. SHOTTENFELD ET AL 3,175,041

FM STEREO DEMODULATOR USING TIME DIVISION SWITCHING

Filed June 11, 1962 3 Sheets-Sheet 2

INVENTORS
Richard Shottenfeld
BY Solomon Abilock
Blum Moscovitz, Friedman & Blum
ATTORNEYS

FM STEREO DEMODULATOR USING TIME DIVISION SWITCHING

Filed June 11, 1962

3 Sheets-Sheet 3

*INVENTORS*
Richard Shottenfeld
Solomon Abilock
*BY* Blum, Moscovitz, Friedman and Blum
ATTORNEYS United States Patent Office 3,175,041
Patented Mar. 23, 1965

3,175,041
FM STEREO DEMODULATOR USING TIME DIVISION SWITCHING

Richard Shottenfeld, Jamaica, and Solomon Abilock, Brooklyn, N.Y., assignors to Pilot Radio Corporation, Long Island City, N.Y., a corporation of Delaware Filed June 11, 1962, Ser. No. 201,682
4 Claims. (Cl. 179—15)

This invention relates to FM stereo signal reception and, more particularly, to an improved and simplified multiplex adapter for converting monophonic FM signal receivers for use as FM multiplex stereophonic receivers.

Various arrangement or systems for stereophonic signal transmission have been known for some time. Usually, these have involved the broadcasting of separate AM and FM signals from two different, although sometimes closely associated, stations. The listener then uses an AM receiver and an FM receiver separately to pick up the two signals, one being the "left" audio signal and the other being the "right" audio signal, one each of these signals being carried by the AM transmission and the other by the FM transmission. Arrangements have also been suggested wherein two cooperating and closely associated FM transmitters would be used to broadcast separate signals corresponding, respectively, to the "right" and "left" audio signals, and the listener would use two FM receivers, or a dual channel receiver and amplifier, to provide the desired stereophonic sound effects.

These known or suggested arrangements have quite clear and obvious disadvantages from the standpoint of the multiple components required, as well as from the standpoint that two broadcasting stations are needed to provide a stereophonic sound effect. For this reason, attempts have been made to provide transmission arrangements wherein both the "left" and "right" audio signals may be transmitted on the same main carrier frequency and effectively demodulated at the receiver to provide the separate signals for stereophonic reception.

One of the difficulties in developing a suitable system has been the well understood requirement that such a system be compatible; that is, be capable of transmitting signals which could be received either by monophonic or stereophonic receivers. A system meeting these requirements, and which requires only a single main carrier frequency, has recently been approved by the appropriate government agency and is commonly known as "FM Multiplex Stereo." In this system the main carrier frequency, which may be of the order of 100 mc., is modulated by two signals. One of these is the sum of the left and right audio signals, hereinafter designated as "$L+R$." The other is the suppressed carrier sideband spectrum produced by amplitude modulation of a supersonic carrier with the "difference" signal, which is the difference between the left and right audio signals, and is hereinatfer referred to as "$L-R$."

If the main carrier frequency were directly modulated with both the "sum" signal $(L+R)$ and the "difference" signal $(L-R)$, the result would be a monophonic blend of L and R. To be specific, the net modulation would be the same as that from a signal $$(L+R)\pm(1-K)(L-R)$$

where K represents the relative modulation by $(L-R)$ expressed as a fraction of the modulation produced by $(L+R)$.

Thus, if $K=0$, the net modulating signal would be either 2L or 2R depending upon the sign between terms, which latter expresses the relative phase of the two modulating signals.

If $K=1$, the net modulating signal would be $(L+R)$.

If K lies betwen zero and unity, the net modulating signal is between the limits indicated, that is a monophonic blend of varying proportions of L and R. To avoid this kind of blending, the difference signal is translated so that it occupies a frequency spectrum which is different from the spectrum occupied by the sum signal. Hence, in FM multiplex stereophonic transmission and reception, the "difference" signal $(L-R)$ is used to modulate a supersonic carrier frequency substantially above the upper level of audible frequencies, which is of the order of 20,000 c.p.s. For example, the supersonic carrier frequency is preferably 38,000 c.p.s.

This supersonic carrier frequency is amplitude modulated with the difference signal $(L-R)$, and then the residual supersonic carrier is suppressed to leave only the sideband spectrum which then is used to modulate the main carrier frequency, which may be of the order of 100 mc.

At the receiving station, the "sum" signal $(L+R)$ is derived by demodulating the main carrier frequency in the usual manner, and the resulting audio signal may be heard through a usual monophonic receiver. However, the difference signal $(L-R)$, being a modulation on a suppressed carrier which has a frequency well above the range of audible sound, passes through the monophonic receiver without there being any audible sound produced, and thus has no effect upon the reception of the monophonic receiver, which latter receives and demodulates frequency modulation audio signals in the usual manner.

To derive the difference signal, there is provided a special section called a "multiplex" section or adapter in which the modulated suppressed carrier is demodulated and the difference signal is derived therefrom. The difference signal is then combined with the sum signal to derive the left audio signal (L), and the right audio signal (R), and these two audio signals are then deemphasized, in a known manner, and separately amplified in a stereoamplifier section which may comprise either a pair of amplifiers or a two-channel amplifier, the sound being reproduced by physically spaced speakers each connected to the output of a respective one of the stereoamplifiers or to a respective one of the channels of a two-channel stereoamplifier.

One of the requirements of the multiplex adapter is ability to separate the two components, namely the sum signal $(L+R)$ and the difference signal $(L-R)$, and various arrangements have been proposed for doing this. However, these known arrangements possess various disadvantages.

In one known arrangement, the composite signal is first separated by filtering into two components. After the initially suppressed carrier is reinserted, the difference signal is recovered from the second component by means of AM demodulation. Then the left and right audio signals, L and R, respectively, are obtained by matrixing the sum signal and the difference signal.

In a second known arrangement, direct demodulation of the composite signal is effected by a synchronous switching circuit, and the separation of the left and right audio signals is effected by partially matrixing the switching circuit output with the sum signal $(L+R)$ obtained from the composite signal by filtering.

A serious disadvantage of arrangements using frequency separation filters and matrixing occurs whenever it is attempted to use these circuits in designing a high performance multiplex adapter. In order to obtain essentially complete separation, it is necessary to match both the signal level at the matrix and the transmission time delay through the filters to an extremely high degree of precision for every frequency in the audio spectrum. While a circuit to match the signal level is not very difficult to provide, especially if a gain control is used, the time delay problem is not so easily solved. The solution of this problem would require a large number of filter sections to match the frequency response and the time delay of a low-pass filter and its corresponding band-pass structure, to the precision necessary for complete separation of the left and right audio signals over the entire audio spectrum. In consumer equipment, it is practical to use only a few filter sections; therefore separation can be made high over only a limited frequency range, and the separation must decrease at the upper and lower ends of the audio spectrum, where the frequency response and the time delay of the filters fail to match.

In accordance with the present invention, the advantages of these prior art systems are retained, with elimination of the disadvantages thereof, by providing a multiplex adapter in which the composite modulation is demodulated by using a novel time division switching arrangement in cooperation with a memory or storage circuit. More particularly, the filters, previously thought necessary, have been eliminated, and the recovery of the left and right audio signals directly from the composite signal is effected by a novel signal sampling diode bridge or dual "box car" circuit. This bridge is triggered either by the reinserted supersonic frequency, during alternate half waves, or by any suitable source of synchronized half wave signals. As is known, a "box car" circuit is a time selection and signal storage device.

This triggering, at each half wave of the reinserted carrier, results in a series of spaced pulses divided into two groups, one corresponding to the right and the other to the left audio component of the original signal. In order to maintain continuity, in time phase, between the pulses of each group, a memory or storage arrangement is provided so that a stepped audio function closely corresponding to the respective component is derived.

The invention multiplex adapter has the distinct advantage, as compared to known prior art systems, that no external controls are needed and it is merely necessary to plug the adapter into an FM receiver having a multiplex output terminal supplying the underemphasized FM detector output, and to plug the stereo amplifier into the adapter, as no adjustment of the internals of the multiplex adapter need be made. A synchronized oscillator-doubler is used to provide the time division signal to derive the two components of the composite audio modulation. The frequency of this signal is equal to the frequency of the supersonic carrier upon which $(L-R)$ had been modulated at the transmitter, and is double the frequency of the pilot subcarrier transmittal as part of the composite stereo signal. As a further feature, an indicator lamp or signal is provided which automatically indicates the presence of a stereo signal on an FM broadcast then being received by the FM receiver, and the adapter is automatically switched between "mono" and "stereo" dependent upon the absence or presence of the usual pilot frequency.

The multiplex adapter of the invention further has the very distinct advantage that it gives excellent performance with a great variety of FM tuners, both those of an older type and those of a current type, and has sufficient inherent stability to maintain its high level of performance despite varying input signal levels, environmental changes, and reasonable aging of tubes and components. The installation and connection of the multiplex adapter is so simple that it requires no mechanical skill, in addition to which the unit is very compact and requires a minimum of panel space.

For an understanding of the principles of the invention, reference is made to the following description of a typical embodiment thereof as illustrated in the accompanying drawings. In the drawings.

FIGS. 1 through 6 of the drawings have been shown as it is believed that the operation of the invention arrangement will be understood best by understanding first how the composite signal is formed. As the various waveforms that contribute to the formation of the composite signals are entirely independent, as respects the left and right audio signals, the waveform for the left signal may be chosen independenttly of the waveform for the right signal, and vice versa, for illustration purposes.

Figure 1:
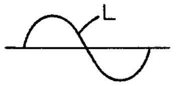
FIGS. 1 and 2 are curves illustrating the left and right audio signals, the left audio signal being indicated, merely for convenience, as a sine wave, and the right audio signal being illustrated, merely for convenience, as a square wave.
Figure 2:
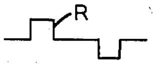

Thus, for example, in FIG. 1 the waveform for the left signal is illustrated at L as comprising a sine wave. This is merely for the sake of convenience. Similarly, for the sake of convenience, the waveform of the right audio signal is illustrated at R as comprising a square wave. This choice of a sine wave illustration for the left audio signal L and of a square wave illustration for the right audio signal R will clarify the formation of the composite signal to a greater extent than if both signals were illustrated as sine waves, for example.

Figure 3:
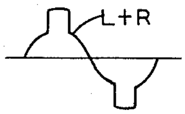
FIG. 3 is a curve illustrating the addition of the left and right audio signals of the waveforms shown in FIGS. 1 and 2.
Figure 4:
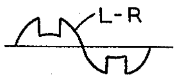
FIG. 4 is a similar curve illustrating the difference signal obtained by combining the waveforms of FIGS. 1 and 2.

In FIG. 3, the sum signal $(L+R)$ is illustrated graphically and, in FIG. 4, the difference signal $(L-R)$ is illustrated graphically. It will be apparent that the waveforms of FIGS. 3 and 4 are obtained by graphical addition and graphical subtraction, respectively, of the two waveforms shown in FIGS. 1 and 2.

As stated, the sum signal $(L+R)$ is used to modulate the main carrier frequency which may, for example, be 100 mc. However, the difference signal $(L-R)$ is used to modulate a supersonic subcarrier frequency by way of suppressed carrier amplitude modulation, with the supersonic subcarrier having a frequency which is very well above the audible range and preferably of an order of in excess of twice the audible range. Thus, with the audible range extending, for example, from 50 cycles to 15 kc., or better, the supersonic subcarrier preferably has a frequency of 38 kc. After modulation of the subcarrier by the difference signal $(L-R)$, the modulated subcarrier, with the 38 kc. carrier suppressed, is used to modulate the main carrier frequency as a supersonic spectrum, or range of tones, which is not audible to one listening to an FM receiver.

Figure 5:
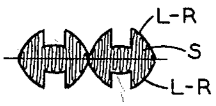
FIG. 5 is a diagram illustrating the waveform resulting from the amplitude modulation of the supersonic carrier by the difference signal $(L-R)$, and subsequent complete suppression of that carrier in the modulated wave.

The modulation of the subcarrier by the difference signal $(L-R)$ is effected as an amplitude modulation of the double sideband, suppressed carrier modulation type. Referring to FIG. 5, the composite waveform appearing when the subcarrier is modulated is illustrated, with the portion of the subcarrier S between the envelopes of the $(L-R)$ double sideband modulation being indicated by way of a wavy line.

Figure 6:
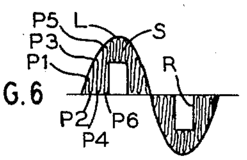
FIG. 6 is a diagram illustrating the form of the composite $L+R+(L-R)$ sideband signal, except for the pilot subcarrier which has been omitted for reasons of clarity in the diagram, transmitted on the main carrier, and is also the form of the signal entering the multiplex adapter.

In the transmission system, a pilot signal, which may be 19,000 c.p.s., is utilized. However, as this signal plays no direct part in the demodulation process, it has been omitted from FIGS. 1 through 6, although it finds other use in the apparatus, as will be described. In FIG. 6, the composite signal, comprising the sum signal $(L+R)$ and difference signal $(L-R)$ sidebands is illustrated, along with the subcarrier or suppressed carrier S. The sum and difference signals thus forming the composite signal are illustrated as after demodulation from the main carrier frequency.

Referring to FIG. 6, it will be noted that alternate peaks P of the 38,000 c.p.s. waveform terminate on envelopes which have the same wave shapes as the original left (L) and right (R) audio signals. Thus, peaks P1, P3, P5, etc., terminate on the envelope or waveform corresponding to the left audio signal L, and peaks P2, P4, P6, etc., terminate on the envelope having the waveform of the right audio signal R. Consequently, in the composite signal illustrated in FIG. 6, the left and right signal information is maintained separately on the two envelopes L and R which form the boundaries of the 38,000 c.p.s. waveform. Noting this, it will be apparent that the signals can be recovered separately and independently by circuitry which allows the appropriate output to "view" or "see" the composite signal at suitably timed intervals.

The mathematical expression for the composite waveform shown in FIG. 6 is as follows:

*Table A*

$$E_t=(L+R)+(L-R)(\cos 2\pi f_{sc}t)$$

where L is the left channel signal as a function of time, R is the right channel signal as a function of time, and $f_{sc}$ is the subcarrier frequency (38,000 c.p.s.).

With a sampling function of $\overline{E}=E_t$ taken at the instants $t=n/2f_{sc}$, with $n$ being the series of consecutive integers 1, 2, 3, . . . and with $\overline{E}_t=0$ at all other times, then $$\overline{E}_t=(L+R)+(L-R)(\cos n\pi)$$

For even values of $n$ $$\overline{E}_{t(n\ even)}=(L+R)+(L-R)\times(+1)$$
$$=2L=\text{pure left channel signal}$$

For odd values of $n$ $$\overline{E}_{t(n\ odd)}=(L+R)+(L-R)\times(-1)$$
$$=2R=\text{pure right channel signal}$$

The effect of applying the mathematical sampling function to the expression for the composite signal of FIG. 6 is the same as physically viewing the waveform for very brief instants. Namely, the thus sampled waveform comprises a series of narrow spikes emanating from the base line and terminating at the values of $E_t$ at each of those brief instants.

From sampling theory, it is known that the original continuous function can be completely and accurately recovered from the sampled function by low-pass filtering, provided that the sampling rate is more than twice the highest frequency component of the original signal. This can be done for the signals involved in FM stereo or multiplex because the 38,000 c.p.s. frequency of the supersonic subcarrier S is more than twice 15,000 c.p.s., which is substantially the upper limit, for all practical purposes, of the audio band or audible sound.

When the sampling consists of very narrow pulses, the energy content is quite low and the recovered continuous function will have a very low amplitude compared to the input signal. The impulse sampled signal also contains a large component at the sampling frequency, and extensive filtering is required to remove this component. Known prior art circuits used for stereo demodulation have utilized switching signals of long duration, approaching one-half cycle of the 38,000 c.p.s. sampling frequency, in order to build up the energy of the output signal, or increase its amplitude in comparison to the input signal. Unfortunately, this does not provide complete separation of the left and right signals L and R, respectively, and subsidiary matrixing must be used.

In accordance with the present invention, it has been found that the desired amplitude of the output can be greatly increased, and the sampling frequency component decreased, by using circuitry which has the ability to hold the output constant at the level of one sample until the following sample appears. Such circuits are called "memory circuits" or "data hold" circuits. Utilizing such memory circuits, the output waveform can be changed to become a "staircase" or "step" function approximation of the continuous function. This "staircase" or "step" function approximation provides a great deal more energy, and thus the output signal level is more nearly identical to the input signal level.

In the invention arrangement, short duration pulses, of the order of $\frac{1}{20}$ of a cycle of the 38 kc. subcarrier frequency, are used because complete separation can be obtained in that manner. When the memory circuits or data hold circuits are used to build up the energy of the recovered signals, the output can be maintained within 1 or 2 db of the input, and the sampling frequency component is very substantially reduced.

Figure 7:
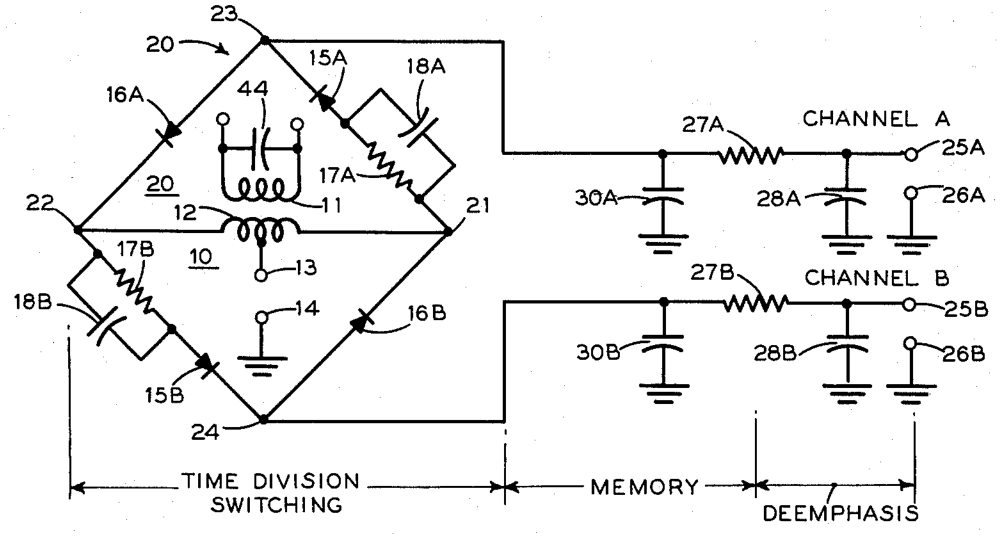
FIG. 7 is a schematic wiring diagram of the demodulating or decoding circuit forming the principal subject matter of the invention.

A circuit for effecting this is illustrated in FIG. 7, and may be said to constitute the essential feature of the present inveniton. In FIG. 7, a transformer 10 is tuned to 38,000 c.p.s., the frequency of the supersonic subcarrier, and has a primary winding 11 and a secondary winding 12. Primary winding 11 receives a 38,000 c.p.s. signal from a frequency doubler described hereinafter. Secondary winding 12 is accurately center-tapped so as to yield equal voltages to either side of the center tap, and the composite signal is fed into the center tap of secondary winding 12 from input terminals 13 and 14, of which terminal 14 is illustrated as grounded.

It will be noted that the secondary winding 12, which is center-tapped and thus divided accurately into two sections, forms part of a bridge circuit indicated at 20 having junction points 21, 22, 23, and 24. Secondary winding 12 has one-half its length connected between input terminal 13 and junction point 21, and the other half its length connected between input terminal 13 and junction point 22. A resistance 17A is connected, in series with a diode 15A, between junction point 21 and junction point 23, and a capacitance 18A is connected in parallel with resistance 17A. A second diode 16A is connected between junction point 23 and junction point 22. A diode 15B is connected, in series with a resistance 17B, between junction point 22 and junction point 24, and a capacitance 18B is connected in parallel with resistance 17B. A diode 16B is connected between junction point 24 and junction point 21.

In effect, the bridge comprises a pair of signal sampling and storage, or "box car," circuits connected in a balanced bridge arrangement with the secondary winding 12 which is center-tapped. As is known to those skilled in the art, a box car circuit is a waveform sampling device providing time selection and storage, and these circuits have been widely used, for example in radar installation. However, as used hitherto, such box car circuits have been applied only singly and only for signal sampling, and the novel feature of the present invention is the use of a pair of these circuits in a bridge arrangement for the purpose of selecting out the two components of a stereo program from a transmitted composite signal and with substantially complete suppression of the timing or triggering signal in the output of the bridge.

The voltage developed across secondary winding 12 causes diodes 15A and 16A to conduct for a small fraction of a cycle each time that terminal or junction point 21 is positive with respect to terminal or junction point 22. Similarly, the voltage causes diodes 15B and 16B to conduct for a small fraction of a cycle each time that terminal 22 is positive with respect to terminal 21. The networks 17A–18A and 17B–18B control the respective conduction time intervals by biasing the associated diodes into a conductive state. Whenever the diodes are nonconducting, their common terminal, such as 23 or 24, is, in effect, disconnected from the input terminal 13. When the diodes do conduct, there is a low impedance path between input terminal 13 and the respective common junction 23 or 24. By proper phasing of the 38,000 c.p.s. signal, the conduction time of the diodes may be made to coincide, in time, with the peaks of the composite signal waveform and, by making the conduction period very short, the high separation associated with impulse sampling is effected.

It will be noted that the diodes 15B and 16B are connected reversely with respect to diodes 15A and 16A, so as to obtain a reversal of polarity. Thus, the common junction 23 of diodes 15A and 16A is connected effectively to input terminal 13 only when diodes 15B and 16B are nonconducting, and vice versa. The arrangement thus functions as a momentary contact, single-pole, double-throw switch that connects the input terminal 13 alternately to the channel A output terminal 25A and to the channel B output terminal 25B, each one of which has associated therewith a grounded terminal 26A or 26B, respectively.

Figure 8:
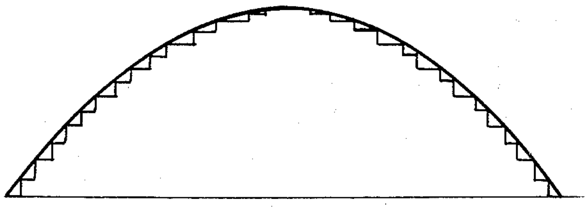
FIG. 8 is a curve schematically illustrating, to a greatly enlarged scale, the form of one component signal derived by the decoding circuit of FIG. 7.

The memory elements, or "data holds" comprise the capacitors 30A and 30B, respectively, in the "channel A" and "channel B" circuits. The values of these capacitors are made sufficiently small so that each capacitor can charge rapidly to the composite signal voltage in the small time interval during which the diodes 15 and 16 conduct. Furthermore, the leakage to ground of the entire output circuit, which tends to discharge capacitors 30A and 30B, is made so small that the voltage across these capacitors remains essentially constant during the time interval between conduction instants. The capacitors 30A and 30B provide the step function as illustrated in FIG. 8. It will be noted that this step function is a very close approximation of the original signal in each channel. The networks 27A–28A and 27B–28B are standard de-emphasis networks.

As stated, the two sections of the transformer secondary winding 12, together with the two "box car," or signal sampling and storage, circuits including the diodes 15 and 16, form a bridge circuit. The 38,000 c.p.s. energy injected into the secondary winding 12 by the primary winding 11 of transformer 10, does not appear between the input terminals 13 and 14, and does not appear between either pair of output terminals. In practice, the bridge need not be balanced to a high degree of precision, as even a fair balance will give quite good suppression of the 38,000 c.p.s. signal and the de-emphasis networks also help. The diodes 15 and 16 must have a "turn-on" speed which is rapid compared to 38,000 c.p.s., or otherwise the suppression of the stereo subcarrier will depend too strongly on matching this characteristic between the two diodes. Preferably, the diodes should be capable of switching on or off in less than one microsecond. Furthermore, the diodes must conduct synchronously with the peaks of the 38,000 c.p.s. waveform in the composite signal, as failure to do so will result in loss of separation effect on the composite signal.

Figure 9:
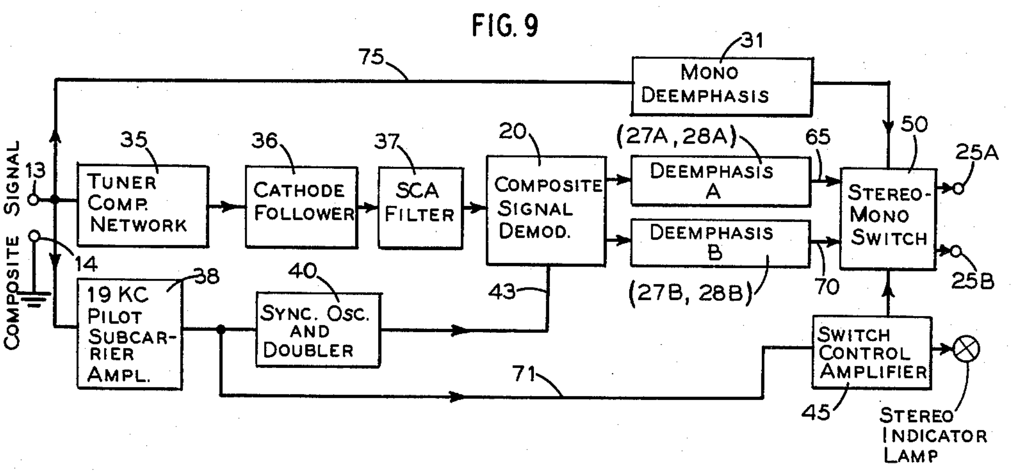
FIG. 9 is a block diagram of the multiplex adapter of the invention.
Figure 10:
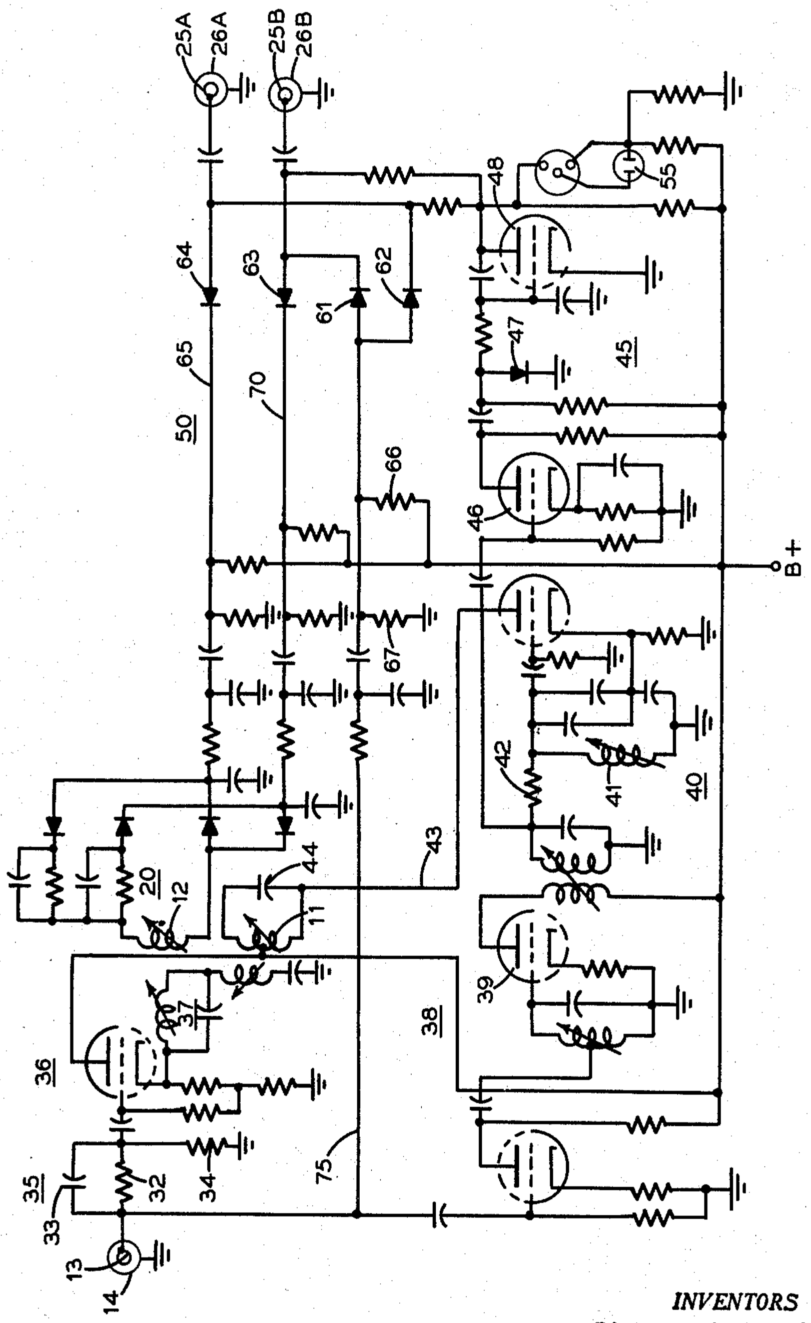
FIG. 10 is a substantially complete schematic wiring diagram of the multiplex adapter.

Referring to FIGS. 9 and 10, FIG. 9 illustrates the complete multiplex adapter in block form and FIG. 10 is a schematic diagram of the multiplex adapter. As illustrated in FIG. 9, there are three signal paths extending from the input terminal 13. The upper path 75 is for a monophonic signal and it contains only a de-emphasis network 31. The central signal path of FIG. 9 contains all of the circuits concerned with demodulation of the composite signal, and the lower path contains the circuits, which work with the pilot subcarrier and the stereo subcarrier. At the right end of the diagram in FIG. 9, all three signal paths terminate in the stereo-mono switch circuit block 50, which has two paths extending to the two outputs, such as to channel "A" and to channel "B."

In the demodulator signal path, the first block is the tuner compensating network 35 whose purpose is to provide phase and amplitude correction to composite signals received from tuners with frequency response roll-offs at 53,000 c.p.s. An ideal tuner would not have any such roll-off and, for such a tuner, the compensating network 35 is not necessary and should be removed or bypassed. However, the great majority of tuners presently available and manufactured prior to the commercial introduction of the FM stereo multiplex signal transmission system, requires such a network, as its use provides a very substantial improvement in signal separation.

As shown in FIG. 10, the network 35 comprises a resistor 32, a capacitor 33 shunting the resistor 32, and a resistor 34 connected to ground. Typically, resistor 32 may have a value of 680,000 ohms, capacitor 33 may have a value of 39 pf., and resistor 34 may have a value of one megohm. The configuration of the network 35 is that of a phase-led high frequency boost network, and the values have been selected so that the network is the inverse of that circuit, in an average tuner, which produces the undesirable roll-off.

After passing through the tuner compensating network 35, the composite signal, with all its frequency components in correct time relationship. and proper relative amplitudes, passes through a low-distortion cathode follower 36 to provide a low impedance driving source for the circuits that follow.

From the cathode follower 36, the composite signal passes through the SCA filter 37. This is a band rejection network, rather than a simple resonance circuit providing only an attenuation notch. The filter 37 provides uniform attenuation over the range of frequencies from 67,000 to 76,000 c.p.s., and affects the response at 50,000 c.p.s. by less than one db. The advantage of such a filter is that there is attenuation for the SCA sidebands as well as for the carrier, and the upper sidebands, which produce low frequency beats with 76,000 c.p.s., are uniformly attenuated. From the SCA filter 37, the composite signal enters the demodulator 20 already described in connection with FIGS. 7 and 8.

Referring to the lower path of the block diagram shown in FIG. 9, a two-stage tuned 19,000 c.p.s. amplifier 38, shown schematically in FIG. 10, selects and amplifies only the pilot subcarrier. It is important to remove all vestiges of modulation from the pilot subcarrier before using it to synchronize the oscillator-frequency doubler 40, or otherwise distortion may result. The oscillator 40, which is strongly locked to the pilot subcarrier, generates the 38,000 c.p.s. triggering frequency that actuates the demodulator 20. It will be noted that the oscillator coil 41 is loosely coupled to the output of the 19,000 pilot subcarrier amplifier 38 only by the resistor 42. This resistor 42 may be, for example, a 0.47 megohm resistor. The resistive coupling 42 assures that both tuned circuits operate at resonance.

If inductive or capacitive coupling between the pilot subcarrier amplifier and the oscillator were used, there would be a detuning effect that would shift the phase of the oscillator when the amplitude of the synchronizing signal varied. This undesirable effect is avoided by using the pure resistance coupling 42, thus building up a large synchronizing signal and loosely coupling it to the oscillator 40 so that strong synchronizing action is obtained even with the weak coupling that is necessary to avoid interaction between the two tuned circuits. The 38,000 c.p.s. synchronizing or triggering signal is supplied to the primary winding 11 of the transformer 10 through a conductor 43, there being a condenser 44 connected across the winding 11.

All the tuned circuits must be accurately temperature compensated to avoid phase shift as the unit heats. In this connection, it is most important to compensate each circuit by itself as, unless this is done, there will be a variation in the ability to maintain proper phase with different signal levels as the unit heats up.

Figure 11:
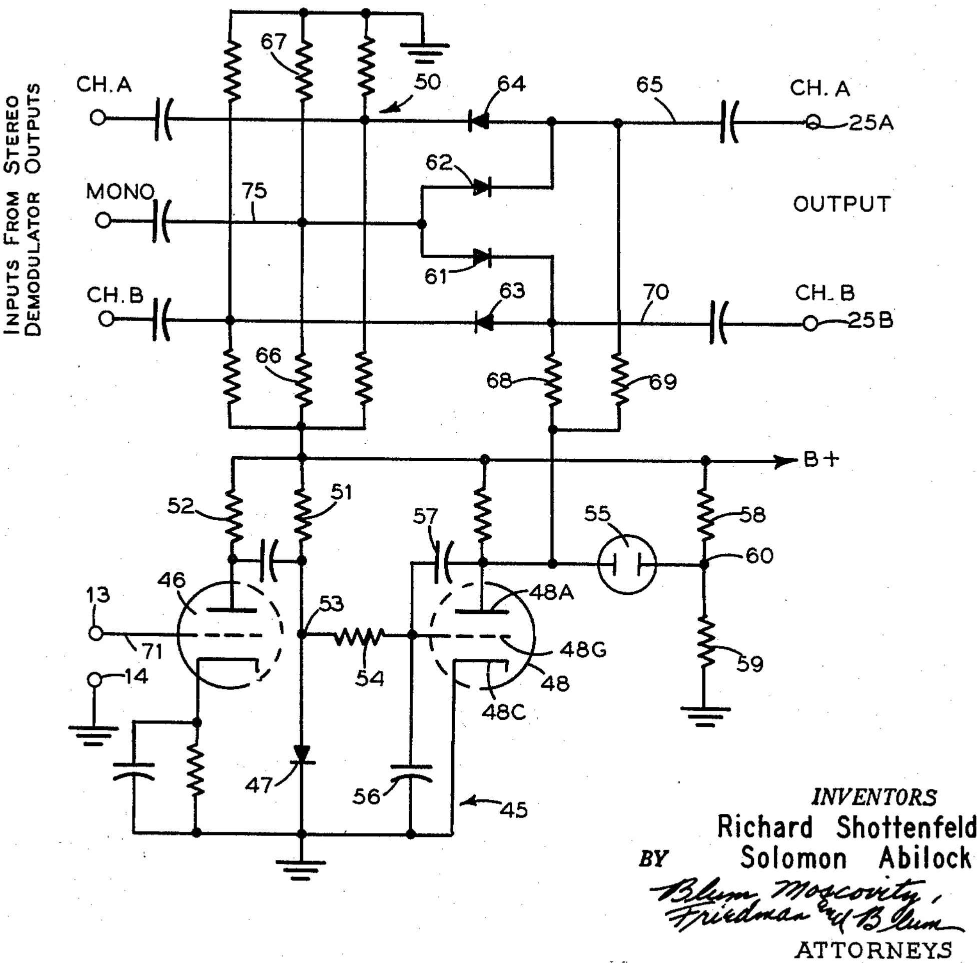
FIG. 11 is a schematic wiring diagram of the "stereo-monoswitch" of the block diagram of FIG. 9.

FIG. 11 shows, to a larger scale than FIG. 10, the schematic wiring diagram of the stereo-mono switch circuitry which includes a switch control amplifier 45 and the stereo-mono switch 50. As stated, the three signal paths of FIG. 9, starting from the input terminals 13 and 14, lead to the stereo-mono switch 50 which has output terminals 25A and 25B for each of the two channels. Before describing the circuitry of FIG. 11, it should be pointed out that some FM stations broadcast SCA programs in the stereo subcarrier frequency range and in addition to the regulator monophonic programs. This will cause interference with a monophonic program if the program is listened to through a multiplex adapter. Consequently, it is advisable to use the multiplex circuitry only when actually listening to a stereo program. Many known multiplex adapters provide a manual switch for selection between monophonic reception and multiplex reception. Because of requiring this manual switch, such adapters cannot be tucked away or concealed in an installation unless the associated equipment has switching that can by-pass the adapter.

In the present invention, automatic switching, which is actuated by the pilot subcarrier, is used to by-pass the multiplex circuits when the latter are not needed. Consequently, the multiplex adapter of the present invention does not require any controls for the user to operate and thus can be installed in any out-of-the-way spot, as by concealment in a console.

As stated, the circuitry comprises two major parts, which are the switch control amplifier 45 and the stereo-mono switch 50. The switch control amplifier 45 comprises an amplification stage 46 for amplifying the 19,000 c.p.s. pilot subcarrier, a forward biased diode 47, a slow acting D.C. amplifier 48, and a neon lamp indicator 55. Amplifier stage 46 receives a 19,000 c.p.s. signal from the pilot subcarrier amplifier 38, and the output of amplifier stage 46 appears across the diode 47 which is forward biased by the current through resistor 51.

As the input voltage increases from zero, nothing happens at first at the diode 47 because the current through this diode causes it to be a short circuit across the load resistor 52. However, as soon as the 19,000 c.p.s. current exceeds the bias current in diode 47, the junction 53 of resistors 51 and 54 starts to go negative with respect to the cathode of amplifier 48. This tends to lower the plate current of the amplifier 48.

The action so far may be described as follows: With no input signal, the grid 48G of amplifier 48 is at the same potential as its cathode 48C. Amplifier 48 conducts strongly and its plate voltage is low, for example, about 50 volts. When the 19,000 c.p.s. input signal to amplifier 46 exceeds the threshold value, amplifier 48 becomes biased and its plate voltage rises. Because of the high gain, the transition of the plate current of amplifier 48 from saturation to cut-off is very rapid and the plate voltage swings from 50 volts at saturation to almost 160 volts at cut-off. A filter, comprising the resistor 54 and a capacitor 56, allows only the D.C. component of the rectified output of diode 47 to reach the grid 48G of amplifier 48, and capacitor 57 slows the response time of amplifier 48 to prevent transients from reaching the switch 50.

The stereo indicator lamp 55 is lit when the voltage across it equals or exceeds its striking or ignition voltage, which is about 80 volts. One terminal of neon indicator lamp 55 is connected to the junction 60 of resistors 58 and 59, and this combination of resistors maintains such one terminal at about 40 volts positive with respect to the chassis. When the anode 48A of tube 48 has a potential of 50 volts with respect to ground, the potential across lamp 55 is only about 10 volts and therefore the latter does not light. However, when amplifier 48 is cut off, the voltage of its anode 48A is about 160 volts which exceeds 40 volts by more than 80 volts, and consequently the indicator lamp 55 is lit.

The switching elements are silicon diodes 61 through 64, which are controlled by the anode potential or amplifier 48. For the mono signal, diodes 61 and 62 have a common anode potential maintained at about 110 volts by the voltage divider consisting of resistors 66 and 67 whose impedance is very high compared to that of the signal circuits. The cathodes of diodes 61 and 62 are not interconnected, but are separate, with the cathode of diode 62 being connected to the channel "A" output line 65 and the cathode of diode 61 being connected to the channel "B" output line 70.

The cathode potential of diodes 61 and 62 can be varied by the anode swing of amplifier 48 acting through the resistors 68 and 69. When the anode potential of amplifier 48 is substantially 50 volts, the cathodes of diodes 61 and 62 are negative with respect to their anodes and the diodes conduct. The signal path through these two diodes is thus closed, and the monophonic signal is connected to both output lines 65 and 70.

Conversely, when amplifier 48 is cut off, the cathodes of diodes 61 and 62 are positive with respect to their anodes and thus these diodes are cut off and nonconductive. The signal path through them is thus broken and the monophonic signal is disconnected from both outputs 65 and 70.

The stereo switching diodes 63 and 64, also biased to about 110 volts by resistors 66 and 67, are connected in reverse polarity, so that they conduct when the monophonic diodes 61 and 62 are nonconductive, and are nonconductive when the monophonic diodes 61 and 62 are conductive. Thus, when there is no 19,000 c.p.s. pilot subcarrier present at the input to the multiplex adapter, the monophonic diodes 61 and 62 conduct, thereby setting up a signal circuit between the mono de-emphasis network 31 and the output lines 65 and 70. Simultaneously, the stereophonic diodes 63 and 64 are nonconductive and thus open the signal circuit between the stereo de-emphasis networks 27A, 28A and 27B, 28B and the outputs 65 and 70. Conversely, when the 19,000 c.p.s. signal is present at the input to the multiplex adapter, the diodes 63 and 64 are conductive and the diodes 61 and 62 are nonconductive, so that there is a stereo signal connection established between the stereo de-emphasis networks and the outputs 65 and 70.

The multiplex adapter just described has proven itself in performance, with good stability and no servicing problems.

While a specific embodiment of the invention has been shown and described in detail to illustrate the application of the principles of the invention, it will be understood that the invention may be embodied otherwise without departing from such principles.

What is claimed is:

1. In an FM multiplex stereophonic signal system in which a main carrier frequency is modulated with the sum of the left and right audio signal $(L+R)$, and with a substantially supersonic pilot subcarrier, a supersonic subcarrier frequency is modulated with the difference between the left and right audio signals $(L-R)$, and the main carrier frequency is further modulated with the audio modulations of the supersonic subcarrier frequency: a multiplex adapter for use with an FM receiver without modifying said receiver or requiring manual switching for demodulating the received signals to obtain separate left and right audio signals, said adapter comprising, in combination, a bridge including a pair of oppositely polarized signal sampling boxcar circuits each including a pair of arms of said bridge, and a diagonal interconnecting a pair of common junction points of said bridge, each boxcar circuit having its output connected to a respective audio signal channel; means for applying the composite of said sum and difference audio signals to the midpoint of said diagonals; and means for applying a supersonic frequency triggering signal across said diagonal to trigger said boxcar circuits in alternation and each at the frequency of said triggering signal; said boxcar circuits having a rapid turn-on time compared to said triggering signal frequency; said bridge substantially completely balancing out said triggering signal to provide boxcar circuit outputs each corresponding to a respective completely separated one of said left and right audio signals said adapter including a separate monophonic signal input channel; and switching means operable, responsive to the absence of said pilot subcarrier, to connect said monophonic signal channel to both of said audio signal channels and to block the outputs of said boxcar circuits; said switching means being operable, responsive to the presence of said pilot subcarrier, to effectively disconnect said monophonic signal channel from said audio channels and to effectively connect the outputs of said boxcar circuits to the respective audio signal channels.

2. A multiplex adapter unit, as claimed in claim 1, including an amplifier for said pilot subcarrier; and a synchronized oscillator and doubler coupled to said amplifier and having an output providing said supersonic frequency triggering signal.

3. A multiplex adapter unit, as claimed in claim 2, in which said synchronized oscillator and doubler is loosely resistance-coupled to the output of said amplifier.

4. A multiplex adapter unit, as claimed in claim 3, in which the diagonal of said bridge comprises the accurately center-tapped secondary winding of a transformer; said means for applying a supersonic frequency triggering signal across said diagonal comprising the primary winding of said transformer, across which the output of said synchronized oscillator and doubler is applied.

References Cited by the Examiner

UNITED STATES PATENTS

| | | | |
|---|---|---|---|
| 2,512,530 | 6/50 | O'Brien et al. | 179—15 |
| 3,040,132 | 6/62 | Wilhelm | 179—15 |
| 3,069,505 | 12/62 | Collins et al. | 179—15 |
| 3,070,662 | 12/62 | Eilers | 179—15 |

FOREIGN PATENTS

| | | |
|---|---|---|
| 540,185 | 10/41 | Great Britain. |

OTHER REFERENCES

Audio, "FM-Stereo: Time-Division Approach," August 1961.

DAVID G. REDINBAUGH, *Primary Examiner.*